United States Patent [19]
Volz et al.

[11] Patent Number: 5,957,158
[45] Date of Patent: Sep. 28, 1999

[54] VISUAL POSITION INDICATOR

[75] Inventors: Greg Volz, Lake Hiawatha; Drew LaMarca, Whippany, both of N.J.

[73] Assignee: Automatic Switch Company, Florham Park, N.J.

[21] Appl. No.: 09/075,766

[22] Filed: May 11, 1998

[51] Int. Cl.⁶ .................................................. F16K 37/00
[52] U.S. Cl. ......................................... 137/556; 137/552
[58] Field of Search ..................................... 137/552, 556

[56] References Cited

U.S. PATENT DOCUMENTS

| | | | |
|---|---|---|---|
| 4,470,429 | 9/1984 | Johnson | 137/556 X |
| 5,137,052 | 8/1992 | Baumgart | 137/556 |

*Primary Examiner*—John Fox
*Attorney, Agent, or Firm*—Levine & Mandelbaum

[57] ABSTRACT

A position indication for an actuator of a rotary valve has a rotor of one color mountable on the shaft of the actuator and a stator of contrasting color, each with a plurality of volutes in one-to-one correspondence. The rotor volutes are hidden behind corresponding stator volutes to indicate a closed disposition and extend beyond their corresponding stator volutes to indicate an open disposition of the valve actuator when viewed from a radial direction. Web members on the rotor are rotated into and out of registration with windows in the base and cover of the stator for indicating valve disposition from above. The rotor and stator are congruent to permit the indicator to be inverted depending on the direction of rotation of the valve actuator shaft during opening and closing of the valve.

13 Claims, 9 Drawing Sheets

VISUAL POSITION INDICATOR

BACKGROUND OF THE INVENTION

This invention relates to a position indication for a rotary valve actuator which is used to open or close a rotary valve. More specifically, the invention is directed to apparatus for providing a visual and electrical indication of whether or not a rotary valve is in the open or closed position.

It is known to use pneumatic and hydraulic pressure to operate a rotary valve actuator by applying fluid under pressure to a valve actuator through pneumatic or hydraulic fluid lines. For example, there is known in the art a type of rotary valve actuator having opposing pistons which are coupled to a rack and pinion mechanism for converting pneumatic or hydraulic pressure applied to the pistons to torque for opening and closing a rotary valve.

The rotary valve has a valve member which is directly connected to the output shaft of the rotary actuator and is selectively rotated into and out of the path of fluid flow between the inlet and outlet ports of a valve housing, between open and closed positions which are typically ninety degrees apart. Although the open or closed state of a rotary valve may be indirectly determined by sensing fluid pressure or flow downstream of the valve, it is desirable to have a direct indication of whether a valve is open or closed, independently of fluid flow through the valve. A direct indication of the open or closed state of a rotary valve can be provided from a visual observation of the angular position of the output shaft on the rotary valve actuator relative to a fixed reference, since the output shaft of the rotary valve actuator is directly connected to the valve member.

SUMMARY OF THE INVENTION

The present invention provides a visual indication of the position of either a rotary valve actuator, e.g., a quarter turn or half turn rotary valve actuator. The indicator of the invention is symmetric so that it that can be mounted in an upright or inverted position to allow for clockwise or counterclockwise operation. The indicator has a base and congruent cover, each of which is adapted to be attached to a valve actuator housing. The indicator has a stator and rotor. The stator has individual arcuate sections or volutes of predetermined height that are arranged radially with the beginnings and ends of the volutes overlapping one another.

The heights of the volutes are transverse to parallel planes of the cover and base, above and below respectively. The base and cover have diametrically opposed windows. A rotor of different color than that of the stator has a hub or central cylinder which is keyed to receive and rotate with the output shaft of the rotary valve actuator. The rotor has a concentric cylinder surrounding the central cylinder and diametrically opposed webs extending between the central cylinder and concentric cylinder for moving into an out of registration with the windows in the cover and base of the stator as the rotor is rotated relative to the stator.

Extending from the outer surface of the concentric cylinder are rotor volutes equal in number and orientation and similar in height to the stator volutes. The rotor is rotatably mounted on the stator and has an axis of rotation coincident with a central axis of the stator. The volutes of the stator and rotor alternate so that when the rotary valve actuator operates, the volutes of the rotor are exposed or hidden and the diametrically opposite webs on the rotor move in or out of registration with the windows in the cover and base of the stator, thus appearing as a change in color to indicate whether the valve is open or closed. Index marks on the cover and stator base indicate the degree of extension of the rotor volutes beyond the stator volutes for providing a visual measurement of the relative angular change in position between the rotor and stator which directly corresponds to an angular change in position of the rotary valve actuator.

It is therefor an object of the invention to provide a valve position indicator which employs overlapping volutes to indicate the degree of rotation of a valve actuator and, correspondingly, the open-closed state of the actuated valve.

Another object of the invention is to provide a visual indication of valve actuator position which is variable for showing the degree of valve actuator rotation.

Still another object of the invention is to provide a visual indication of valve actuator position by displaying areas of contrasting colors and relative size.

A further object of the invention is to provide a visual indication of valve actuator having a minimum number of parts for high reliability and ease of manufacturing.

Still a further object of the invention is to provide an indicator which has few areas where dirt or corrosive materials can collect and from which any accumulation can be flushed out.

Other and further objects of the invention will be apparent from the following drawings and description of a preferred embodiment of the invention in which like reference numerals are used to indicate like parts in the various views.

DESCRIPTION OF THE PREFERRED EMBODIMENT

Figure 1:
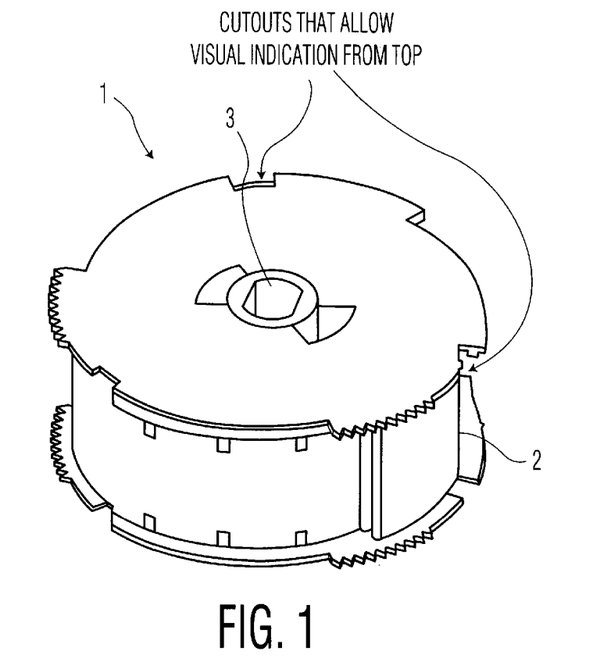
FIG. 1 is a perspective view of the apparatus of the preferred embodiment of the invention in a disposition where the valve is closed.
Figure 2:
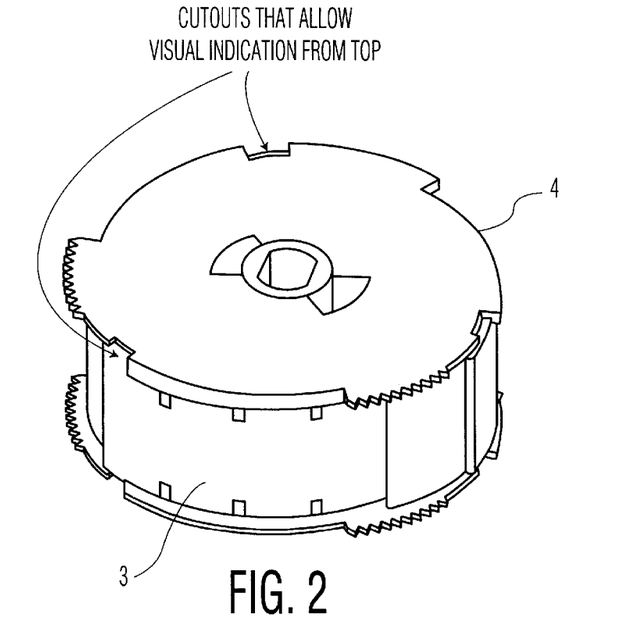
FIG. 2 is a perspective view of the preferred embodiment of the invention in a disposition where the valve is open.
Figure 3:
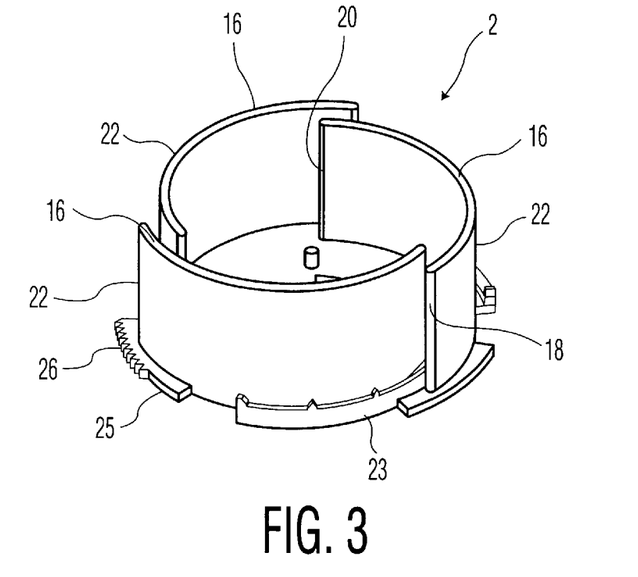
FIG. 3 is a perspective view of a stator component of the preferred embodiment of the invention.
Figure 4:
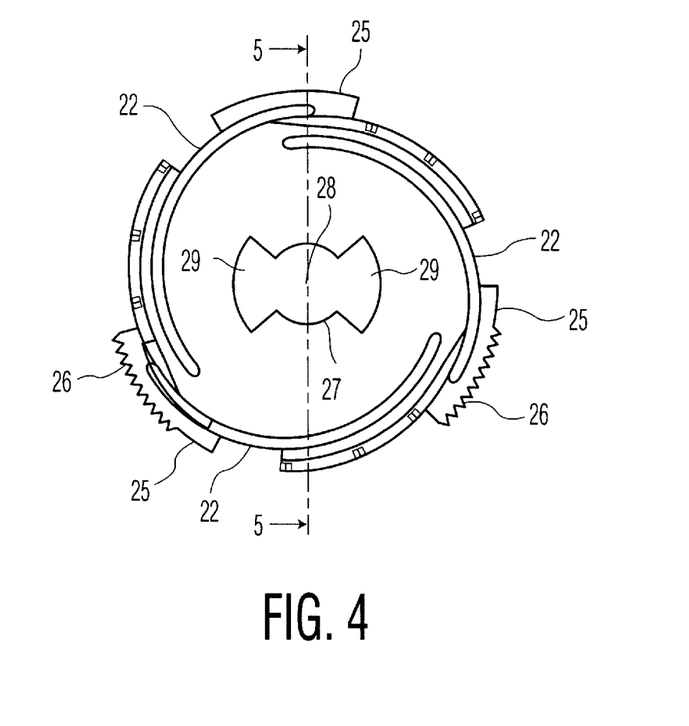
FIG. 4 is a top plan view of the stator of FIG. 3.
Figure 5:
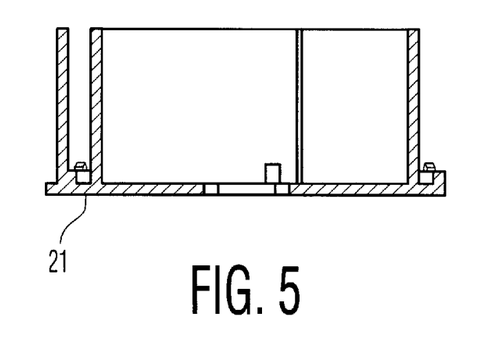
FIG. 5 is a sectional elevation view of the stator taken through line 5—5 of FIG. 4.
Figure 6:
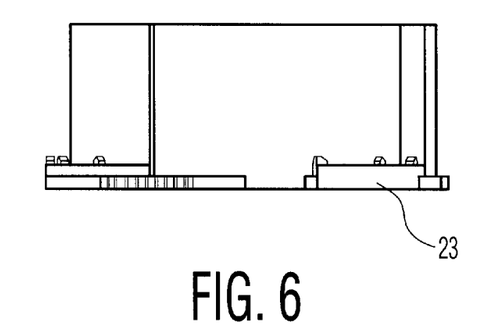
FIG. 6 is a right side elevation view of the stator of FIG. 3.
Figure 7:
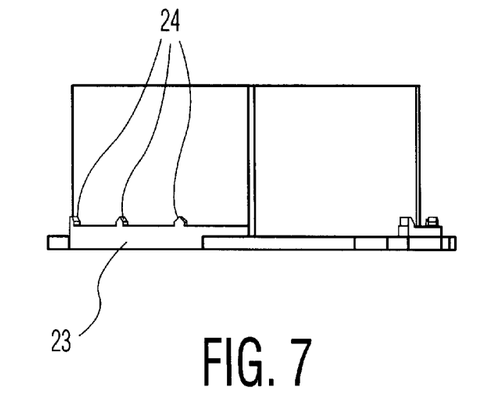
FIG. 7 is a rear elevation view of the stator of FIG. 3.
Figure 8:
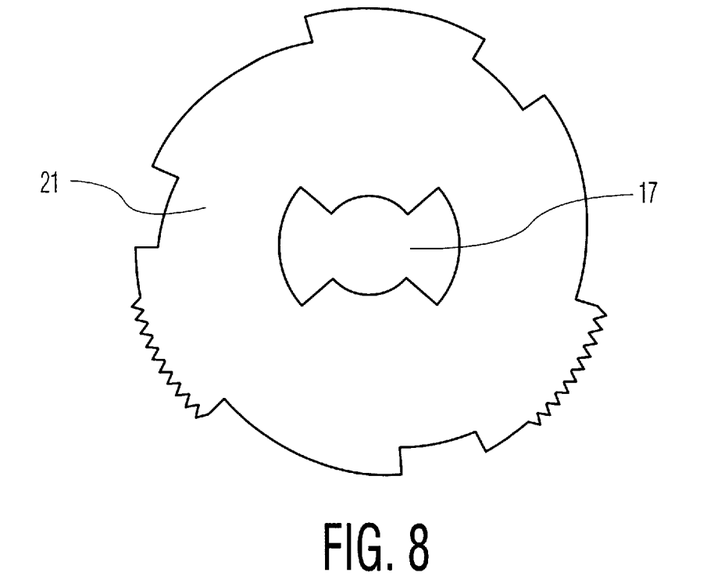
FIG. 8 is a bottom plan view of a stator of FIG. 3.

Referring now to FIGS. 1 and 2 of the drawings, an indicator 1 has a stator 2, a rotor 3, and a cover 4.

Referring additionally to FIGS. 3–8, the stator 2 has a circular base 21 with a central axis 17. Upwardly extending from the circular base 21 are three equiangularly spaced arcuate walls or volutes 22. Each stator volute 22 has a leading edge 18 and a trailing edge 20. Each stator volute's leading edge 18 is radially displaced from the axis 17 by a distance greater than the distance of its trailing edge 20 from the axis 17. On the outer surface of each of the stator volutes 22 along the base 21 of the stator 2 are three respective shoulders 23 from which index pointers 24 extend upwardly.

Circumferentially disposed between the shoulders 23 are three respective extensions 25 of the base 21, two of which have teeth 26 along a portion of their circumferences. The extensions 25 provide a grasping surface for mounting the stator on a valve actuator. These flat disc shape sections 25 of the stator 2 are part of a unique alignment system that allows the indicator 1 to be adjusted to allow for any misalignment of the actuator shaft that drives the indicator 1. Shaft misalignment on the rotary valve actuator is a result of dimensional variations within production or operating tolerances. The invention utilizes the small gear-like teeth 26 to mesh with similar teeth on the surface upon which the indicator 1 is mounted. In the preferred embodiment of the invention there are ten teeth 26 with spacing for a total adjustment of plus or minus 15 degrees.

Figure 9:
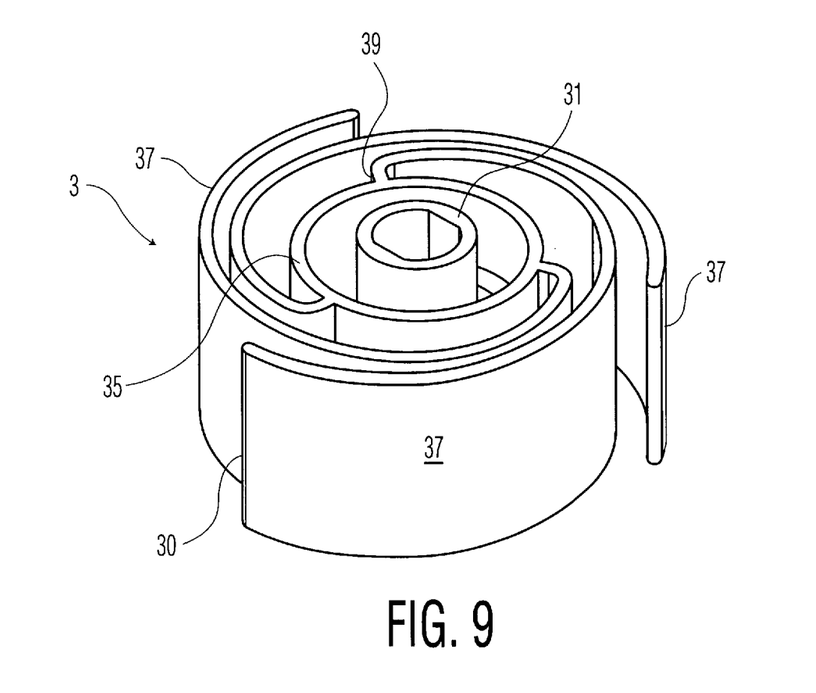
FIG. 9 is a perspective view of a rotor component of the preferred embodiment of the invention.
Figure 10:
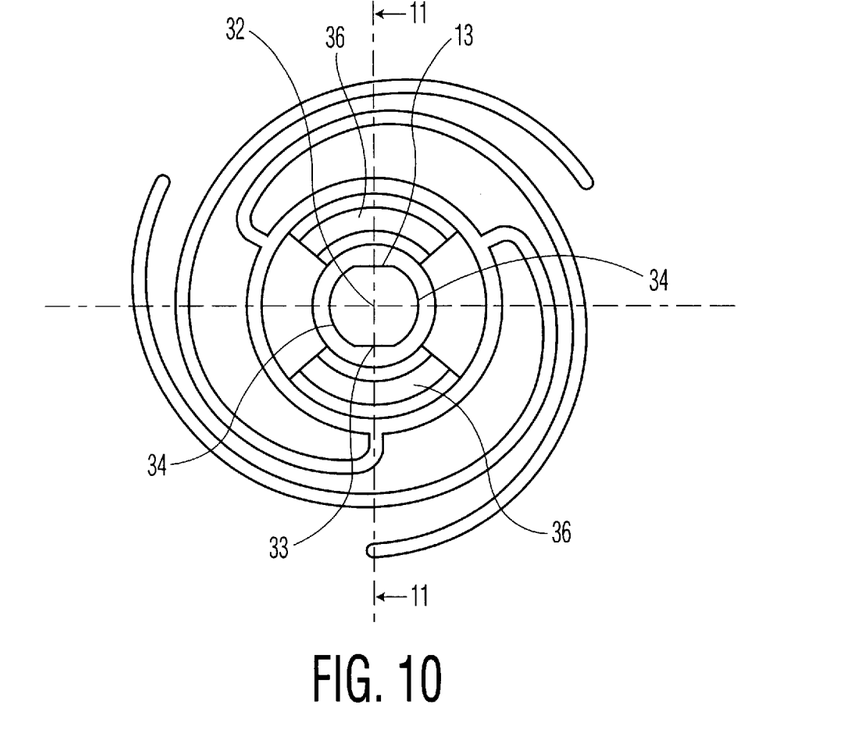
FIG. 10 is a top plan view of the rotor of FIG. 9.
Figure 11:
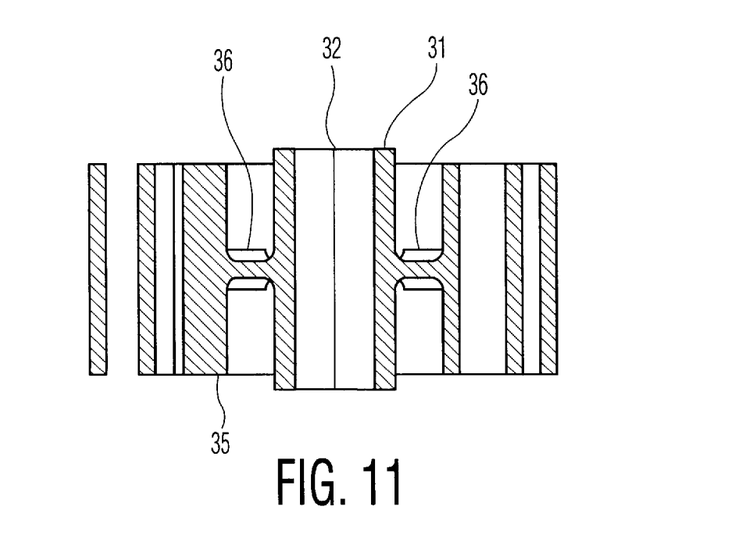
FIG. 11 is a sectional elevation view of the rotor taken through line 11—11 of FIG. 10.

Referring now to FIGS. 9–11, the rotor 3 has a hub 31 in the form of a central hollow cylinder with an axial bore 32, having straight parallel sides 33 connected by arcuate sections 34, for receiving a keyed drive shaft. The hub 31 is surrounded by a circular concentric wall 35. The hub 31 and concentric wall 35 are connected by two intermediate diametrically opposite webs 36 extending from the outer surface of the hub 31 to the inner surface of the concentric wall 35. The webs 36 are diametrically oppositely disposed with respect to the axis 32 of the rotor 3.

Connected to and extending from the outer wall of the concentric wall 35 are three equiangularly disposed arcuate walls or volutes 37. Each of the rotor volutes 37 extends radially from the outer surface of the concentric wall 35 and sharply turns inwardly so that the major length of each rotor volute is disposed along an arc approximately concentric with the axis 32 of the rotor 3. The extended length of the overlapping volutes 37 relative to the angular distance between them also serves to reduce stress upon them.

Each rotor volute 37 has a leading edge 30 and a trailing edge 39, the latter being at the intersection of each rotor volute 37 with the concentric wall 35. Each rotor leading edge 30 is radially displaced from the axis 32 by a distance greater than the distance of the trailing edge 39 from the axis 32. The rotor 3 is coaxially rotatably mounted on the stator for relative rotation between a closed position corresponding to the closed position of the valve actuator output shaft and an open position corresponding to the open position of the valve actuator output shaft. When so mounted, each rotor volute corresponds to one of the stator volutes 22 and has its leading edge 30 radially displaced from the axes 17, 32 by a distance less than the radial displacement of the leading edge 18 of its corresponding stator volute 22 from the axes 17, 32 and greater than the radial displacement of the trailing edge 20 of another stator volute 22, proximate to the leading edge 18 of the corresponding stator volute 22, from the axes 17, 32. The leading edge of each of the rotor volutes 37 is in radial alignment with a portion of its corresponding stator volute 22 when the rotor is in the closed position for hiding the rotor volute.

Figure 12:
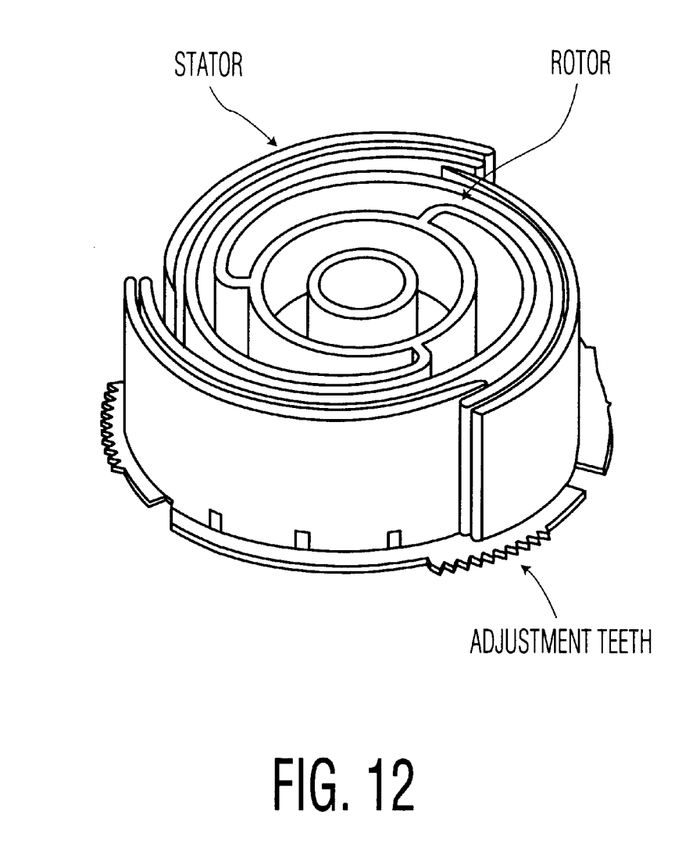
FIG. 12 is a perspective view of the preferred embodiment of the invention, with a cover of the apparatus removed, in a disposition where the valve is closed.
Figure 13:
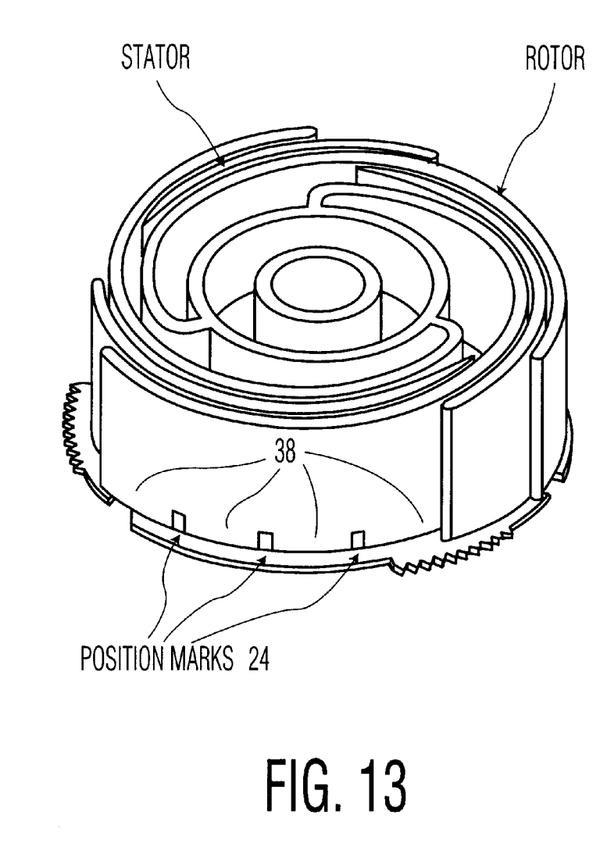
FIG. 13 is a perspective view of the preferred embodiment of the invention, with the cover of the apparatus removed, in a disposition where the valve is open.

Referring now to FIGS. 12 and 13, the volutes 22 of the stator 2 and rotor 3 are positioned relative to one another so that when the rotor 3 is mounted on the stator 2, the rotor 3 can be rotated relative to the stator 2 between one position (FIG. 12) wherein each of the three volutes 37 of the rotor 3 is hidden behind a corresponding one of the three volutes 22 of the stator 2 and another position (FIG. 13) whereat the rotor volutes 37 are exposed.

The leading edge of each of the rotor volutes 37 is in radial alignment with a portion of its corresponding stator volute 22 when the rotor is in the closed position for hiding the rotor volute when viewed from a point external to the indicator along a radial line of sight to the axis 32 when the rotor is in the open position. The leading edge of each of the rotor volutes 37 extends circumferentially beyond the leading edge of its corresponding stator volute 22 for exposing the rotor volute when viewed from a point external to the indicator along a radial line of sight to the axis 32 when the rotor is in the open position. As the rotor 3 is rotated relative to the stator 2, each of the volutes 37 of the rotor 3 extends beyond an end of its corresponding stator volute 22 whereby it is visible from the exterior of the indicator 1.

The degree of extension of the rotor volutes 37 beyond the leading edges 18 of their corresponding stator volutes 22 is an indicator of the degree of rotation of the valve actuator shaft to open the valve, and can be measured by observing its penetration into zones 38 between the index pointers 24.

In the preferred embodiment of the invention, there are three index pointers 24 which define four zones 38, three between adjacent pairs of index pointers 24, and one between a first index pointer 24 and the edge of an adjacent stator volute 22. The degree of rotation of the rotor 3 can be easily determined by observing the penetration of each of the rotor volutes 37 into the regions defined by the index pointers 24. In the preferred embodiment of the invention, the rotor 3 and stator 2 are of contrasting colors. The index pointers 24 are part of, and preferably the same color as, the stator 2 and, therefore, contrast with the volutes 37 of the rotor 3 as they extend from beyond the volutes 22 of the stator 2.

Figure 14:
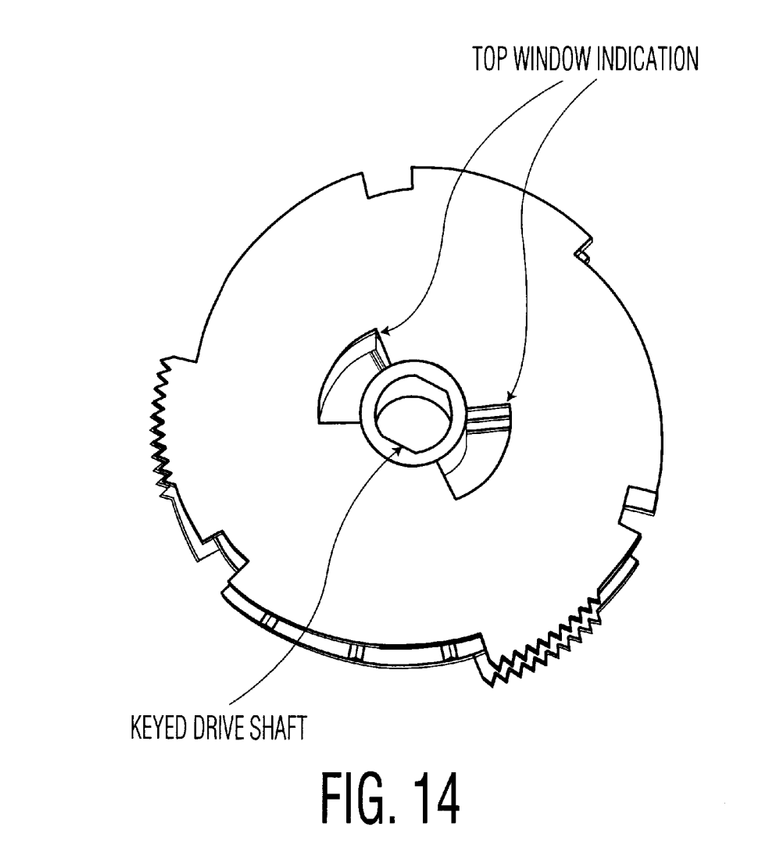
FIG. 14 is a top perspective view of the preferred embodiment of the invention in a disposition where the valve is closed.
Figure 15:
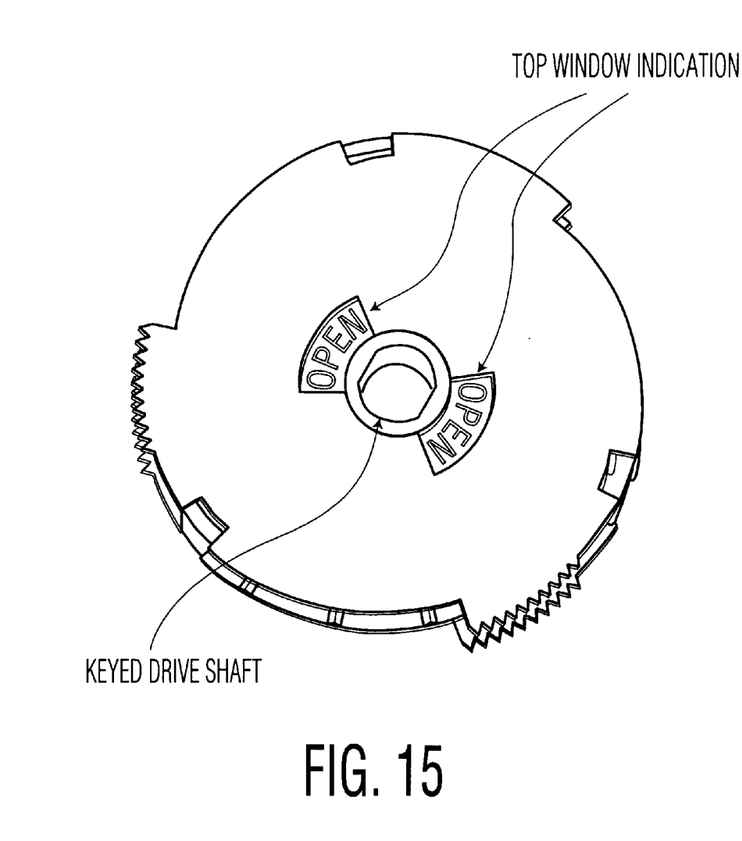
FIG. 15 is a top perspective view of the preferred embodiment of the invention in a disposition where the valve is open.
Figure 16:
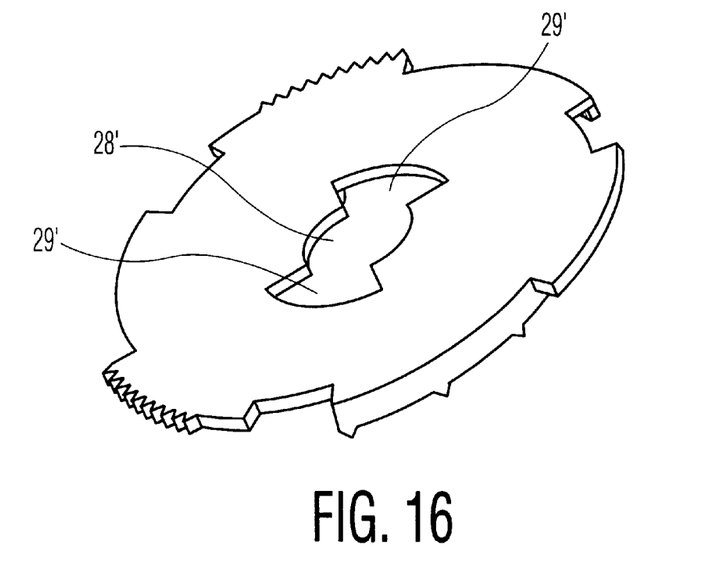
FIG. 16 is a perspective view of the cover of the apparatus of the preferred embodiment of the invention.
Figure 17:
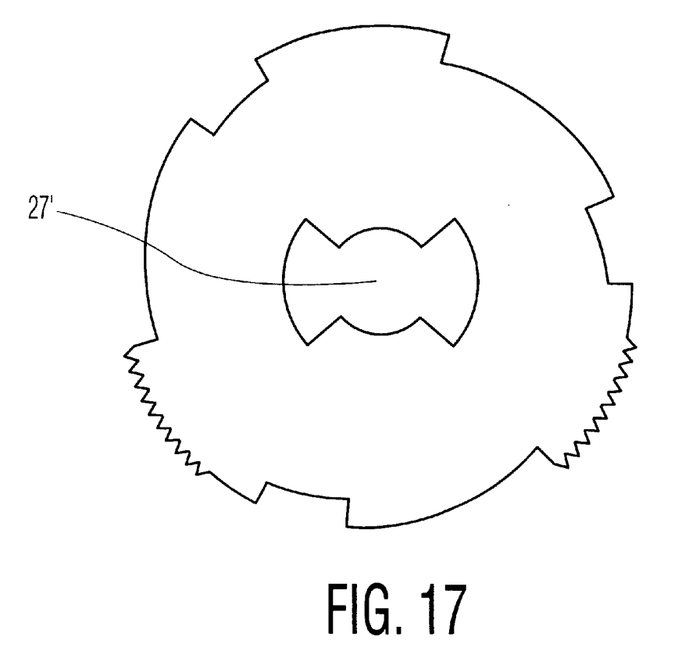
FIG. 17 is a top plan view of the cover of FIG. 16.
Figure 18:
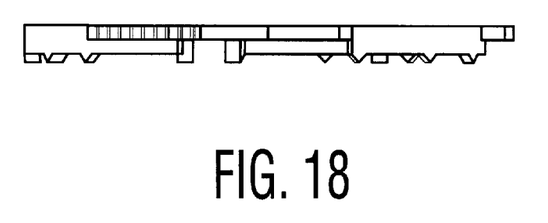
FIG. 18 is a side elevation view of the cover of FIG. 16.
Figure 19:
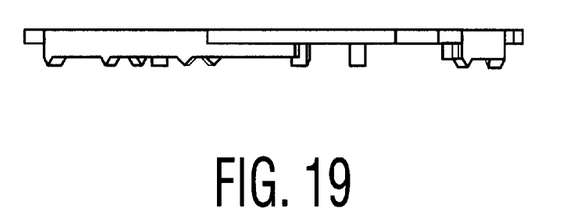
FIG. 19 is a rear elevation view of the cover of FIG. 16.
Figure 20:
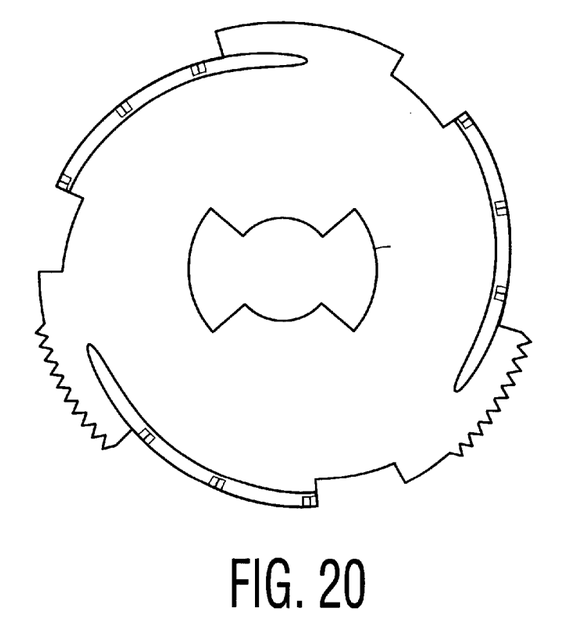
FIG. 20 is a bottom plan view of the cover of FIG. 16.

Referring again to FIG. 4 of the drawings, the base 21 has a central opening 27 in the shape of a double key hole with a central circular area 28 and diametrically opposed windows 29. As can best be seen in FIGS. 14 and 15, depending on the relative position of the rotor 3 with respect to the stator 2, the web 36 between the rotor hub 31 and the concentric wall 35 has an angular width and is positioned on the rotor 3 such that when the rotor 3 has its volutes 37 completely hidden by the volutes 22 of a stator 2, i.e., corresponding to the closed position of the valve actuator (FIG. 14), the webs 36 are out of registration with the keyhole central opening 27 in the base 21 and not visible. When the rotor 3 is rotated to a position whereat the rotor volutes 37 are maximumly extended from behind the stator volutes 22, the webs 36 are in registration with the openings in the stator base 21 and, therefore, visible through the base 21 (FIG. 15). The webs 36, being parts of the rotor 3 and of the same color as the rotor 3, are strikingly visible due to their contrast with the color of the stator base 21.

Referring now to FIGS. 16–20, the cover 4 is congruent to the stator base 21 and is mounted over the free edges 28 of the arcuate walls forming the stator volutes 22 after the rotor 3 is rotatably mounted on the stator 2. Like the base 21, the cover 4 has a central opening 27' in the shape of a double key hole with a central circular area 28' and diametrically opposed windows 29'.

The indicator 1 can then be mounted on a rotary switch actuator with either the cover 4 or the stator base 21 facing upwardly. This enables the same visual indicator 1 to be used irrespective of whether the rotary valve actuator opens by turning in a clockwise or counter clockwise direction. That is, in order to change the direction of rotation of the rotor 3 relative to the stator 2 of the indicator 1, the indicator 1 need merely be inverted before mounting on the valve actuator.

The valve position indicator 1 of the present invention is intended for special manufacturing operations and process industries. The visual indicator 1 of the invention can be mounted on various valve actuators for providing peripheral indication and visual feedback. This indicator features a compact design with a minimum number of parts and maximum visibility from any angle. The indicator can be made from materials that can withstand harsh operating conditions including adverse temperature and chemical environments.

The indicator 1 is preferably encased in a clear polycarbonate enclosure (not shown) that shields the entire indicator 1 from harsh environments such as temperature, moisture, and chemical elements. The polycarbonate enclosure rinses quickly with minimum residue. Polycarbonate will tolerate acids, bases and salt solutions. The materials used in the construction of the indicator 1 are preferably chemical and UV resistant to allow their use in a variety of environments including the outdoors.

It is to be appreciated that the foregoing is a description of a preferred embodiment of the invention to which variations and modifications may be made without departing from the spirit and scope of the invention. For example, the number of volutes can vary because of their arrangement which allows the invention to be easily be adapted to both quarter and half turn actuators. The volutes can either be rigid or flexible depending on their thickness and the material from which they are formed.

What is claimed is:

1. A position indicator for indicating the position of a rotary valve actuator output shaft which is rotatable about an axis between an open position at which fluid flow through a valve is enabled and a closed position at which fluid flow through the valve is disabled, comprising, a stator having a base with a central axis, and a plurality of arcuate stator volutes mounted on said base, each stator volute having a leading edge radially displaced from said axis by a first distance and a trailing edge radially displaced from said axis by a second distance less than said first distance, a rotor coaxially rotatably mounted on said stator for relative rotation between a closed position corresponding to the closed position of said valve actuator output shaft and an open position corresponding to the open position of said valve actuator output shaft, said rotor having a hub with an axial bore, and a plurality of arcuate rotor volutes, each rotor volute corresponding to one of said stator volutes and having a leading edge radially displaced from said axis by a first distance less than the radial displacement of the leading edge of is corresponding stator volute from said axis and greater than the radial displacement of the trailing edge of another stator volute, proximate to the leading edge of said corresponding stator volute from said axis, and a trailing edge connected to said hub, the leading edge of each of said rotor volutes being in radial alignment with a portion of its corresponding stator volute when said rotor is in said closed position for hiding said rotor volute from, and extending circumferentially beyond said corresponding stator volute for exposing said rotor volute to, a point external to said indicator along a radial line of sight to the axis thereof when said rotor is in said open position.

2. A position indicator in accordance with claim 1 wherein one of said stator and rotor has means for fixation to an actuator output shaft and the other of said stator and rotor has means for fixation to a valve actuator shaft housing.

3. A position indicator in accordance with claim 2 wherein said hub has a keyed axial bore for receiving said valve actuator shaft.

4. A position indicator in accordance with claim 2 wherein said base has positioning means for positively engaging said valve shaft housing.

5. A position indicator in accordance with claim 1 wherein said positioning means comprises teeth formed adjacent the circumference of said base.

6. A position indicator in accordance with claim 1 wherein said indicator further comprises a cover mounted on said stator in axially spaced relationship to said base, with said rotor disposed between said base and cover, said cover and base being congruent for enabling said indicator to be mounted on said valve actuator in one disposition for a valve actuator which rotates clockwise as the valve is opened and in an inverted disposition for a valve actuator which rotates counterclockwise as the valve is opened.

7. A position indicator in accordance with claim 1 wherein said stator further comprises graduated indexing means defining index zones therebetween, a leading edge of at least one of said rotor volutes progressively entering said index zones as said rotor is rotated relative to said stator for providing a visible measure of the degree of rotation thereof.

8. A position indicator in accordance with claim 1 wherein said rotor further comprises at least one indicator surface in a plane parallel to a plane of rotation thereof, and at least one of said base and said cover has an opening in registration with said surface when said indicator is in one of said open and closed positions and out of registration with said surface when said indicator is in the other of said open and closed positions.

9. A position indicator in accordance with claim 8 wherein said rotor comprises at least one member extending radially from said hub, said indicator surface being on said member.

10. A position indicator for indicating the position of a rotary valve actuator output shaft which is rotatable about an axis between an open position at which fluid flow through the valve is enabled and a closed position at which fluid flow through the valve is disabled, comprising, a stator having a first plurality of arcuate stator volutes symmetrically spaced about a central axis thereof, each stator volute having a leading edge radially displaced from said axis by a first distance and a trailing edge radially displaced from said axis by a second distance less than said first distance, a rotor coaxially rotatably mounted on said stator for relative rotation between a closed position corresponding to the closed position of said valve actuator output shaft and an open position corresponding to the open position of said valve actuator output shaft, said rotor having a second plurality of arcuate rotor volutes in one-to-one correspondence with said stator volutes, each rotor volute having a leading edge radially displaced from said axis by a first distance less than the radial displacement of the leading edge of is corresponding stator volute from said axis and greater than the radial displacement of the trailing edge of another stator volute, proximate to the leading edge of said corresponding stator volute from said axis, and a trailing edge connected to said hub, the leading edge of each of said rotor volutes being in radial alignment with a portion of its corresponding stator volute when said rotor is in said closed position for hiding said rotor volute from, and extending circumferentially beyond said corresponding stator volute for exposing said rotor volute to, a point external to said indicator along a radial line of sight to the axis thereof when said rotor is in said open position.

11. A position indicator for indicating the position of a rotary valve actuator output shaft which is rotatable about an axis between an open position at which fluid flow through the valve is enabled and a closed position at which fluid flow through the valve is disabled, comprising, a stator having a first plurality of spaced arcuate stator volutes symmetrically spaced about a central axis thereof, a rotor having a second plurality of arcuate rotor volutes in one-to-one correspondence with said stator volutes, said rotor coaxially rotatably mounted on said stator for relative rotation between a closed position corresponding to the closed position of said valve actuator output shaft at which each of said rotor volutes is hidden by its corresponding stator volute and an open position corresponding to the open position of said valve actuator output shaft, at which each rotor volute extends into a space intermediate its corresponding stator volute and an adjacent stator volute whereat at least a portion of said rotor volute is circumferentially displaced from its corresponding stator volute for rendering said portion visible.

12. A position indicator in accordance with claim 11 wherein each of said rotor volutes overlaps an adjacent stator volute when said rotor is in said open position.

13. A position indicator in accordance with claim 11 wherein said rotor comprises a central hub, a wall concentric with and space from said hub, and at least one web member connected between said hub and said wall, said rotor volutes being mounted on said wall, and said stator has an opening axially displaced from said web member, said web member being in registration with said opening when said rotor is in one position relative to said stator and out of registration with said opening when said web member is in another position relative to said stator.

* * * * *